June 2, 1925.    1,540,414
L. MONTUPET
WHEEL FOR AUTOMOBILES OR OTHER VEHICLES
Filed Aug. 16, 1923    2 Sheets-Sheet 1

Inventor
L. Montupet
By Marks & Clerk
Attys.

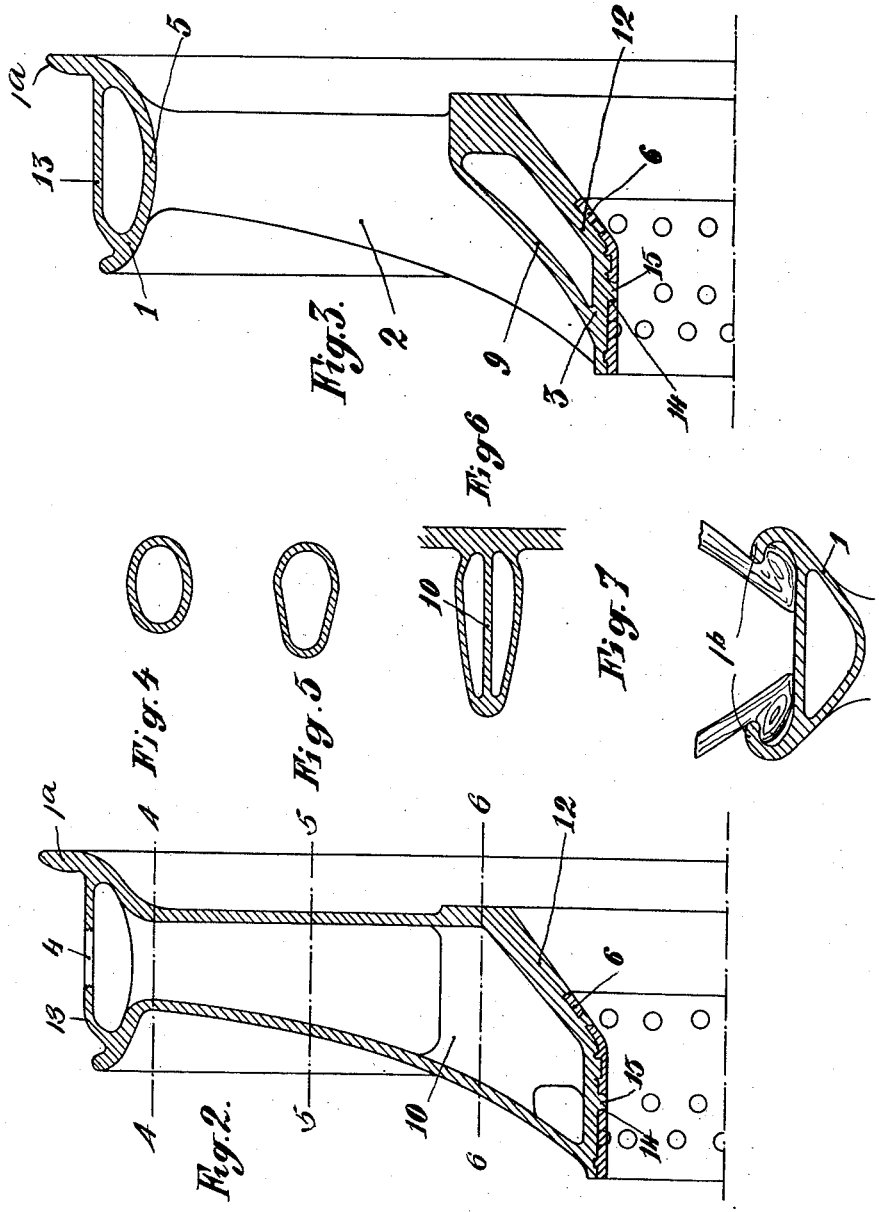

Patented June 2, 1925.

1,540,414

UNITED STATES PATENT OFFICE.

LEON MONTUPET, OF PARIS, FRANCE.

WHEEL FOR AUTOMOBILES OR OTHER VEHICLES.

Application filed August 16, 1923. Serial No. 657,800.

*To all whom it may concern:*

Be it known that I, LEON MONTUPET, residing at Paris, France, have invented new and useful Improvements in Wheels for Automobiles or Other Vehicles, of which the following is a specification.

This invention relates to improvements in wheels and more particularly to metal automobile wheels to be used with pneumatic or cushion tires.

The improved wheel includes a rim, hollow spokes ad a hub of metal cast in a single piece.

The invention is illustrated in the accompanying drawings in which:—

Fig. 2 is an enlarged sectional view of a portion of the same taken on the line 2—2 of Fig. 1.

Fig. 3 is a similar view taken on the line 3—2 of Fig. 1.

Figure 1:
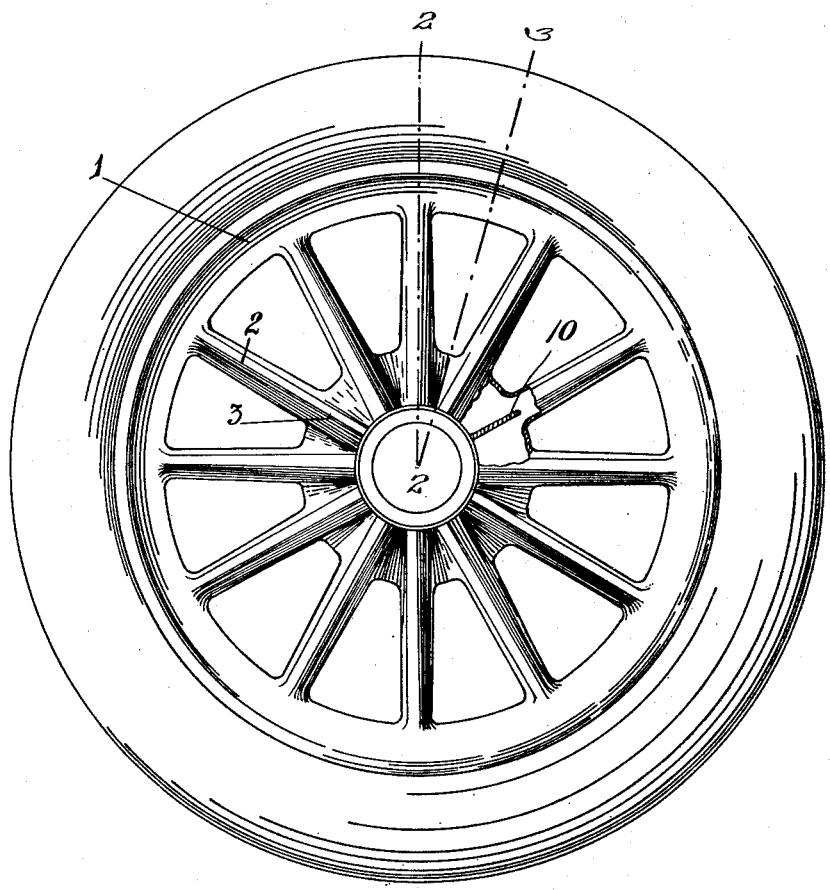
Fig. 1 is a side view of the wheel with a part broken away.

Figs. 4, 5 and 6 are three detail sectional views of one of the spokes taken respectively on the lines 4—4, 5—5 and 6—6 respectively on Fig. 2.

Fig. 7 is a detail sectional view of a modified form of rim.

The wheel illustrated comprises a hollow rim 1, hollow spokes 2 and a hub 3 of metal all cast in a single piece. The rim has on its periphery flanges 1ª to accommodate a straight side tire, or flanges 1ᵇ, as shown in Fig. 7, to engage a clincher type tire.

The rim has a peripheral wall 13 and a series of inner walls 5 between the outer ends of the spokes, and it preferably has a substantially triangular cross section to increase its strength. The outer wall 13 of the rim is provided with apertures 4 (only one of which is shown) to receive, during the casting operation, the sand cores for the spokes. When the casting operation is completed, these apertures may be closed by any suitable means (not illustrated).

The spokes are of tubular formation and they gradually enlarge in cross section from the rim to the hub, as best shown in Figs. 4, 5 and 6.

The hub 3 includes between each two spokes, an inclined wall 9 which reinforces the conical wall 12 of the hub.

Radial partition walls 10 are arranged within the spokes and are integral with the conical wall 12 of the hub, and these partition walls offer great resistance to lateral forces acting in a direction parallel to the axis of the hub.

The hub 3 is lined by a ring 6 of steel or other metal having high tensile strength, and this ring is provided with holes 14 to receive lugs or projections 15 integral with the hub, these lugs being formed by the metal during the casting of the wheel. Owing to these lugs and to the shrinkage of the metal after casting, the ring 6 is securely affixed to the wheel.

Due to the fact that the spokes, rim and hub are cast in a single piece, the structure has very great rigidity and as the parts are hollow, the wheel is not heavier than an ordinary wheel. The wheel also has the advantage of affording a perfect cooling of the tire, as the construction of the wheel in a single piece of metal, and the large sectional area of the hollow spokes, facilitates the radiation of heat towards the center of the wheel while the radiation of heat to the atmosphere is facilitated by the large external area of the spokes and the ventilation due to rotation of the wheel. It may also be seen from the drawing that the spokes are joined to the hub and rim by walls having curved surfaces and due to this, the wheel has a very pleasing appearance and can be readily cleaned.

The wheel may be manufactured of any metal capable of being cast. For use on touring cars, I prefer to cast the same of aluminum, magnesium or their alloys.

From the foregoing it is believed that the construction and advantages of the invention may be readily understood, and it is apparent that changes may be made in the details disclosed without departing from the spirit of the invention as expressed in the claims.

I claim:

1. In combination, a one-piece cast metal wheel having a hub member, a lining ring member in the hub member, one of said members being provided with integral studs and the other member having apertures into which the studs project for locking the two members together.

2. In a wheel, a one-piece cast metal hub member, a metal lining ring member in the hub member, one of said members having integral studs and the other member having apertures into which the studs project for locking the lining member in the hub member.

3. A one-piece cast metal wheel including a hub member having a cylindrical inner ring and a frustro-conical ring integral with the same, hollow spokes integral with said rings and gradually decreasing in cross-section in a direction away from the hub member, hub walls integral with the rings and spokes, arranged between the spokes and inclined substantially parallel to the frustro-conical ring, a tubular rim member integral with the spokes, and pneumatic tire engaging flanges integral with the rim member.

In witness whereof I affix my signature.

LEON MONTUPET.